(12) United States Patent
Kawaguchi (10) Patent No.: US 7,811,000 B2
(45) Date of Patent: Oct. 12, 2010

(54) ROLLING BEARING DEVICE FOR SUPPORTING PINION SHAFT

(75) Inventor: Toshihiro Kawaguchi, Nara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 767 days.

(21) Appl. No.: 11/727,637

(22) Filed: Mar. 27, 2007

(65) Prior Publication Data

US 2007/0242913 A1   Oct. 18, 2007

(30) Foreign Application Priority Data

Mar. 29, 2006   (JP) .............. P2006-090415

(51) Int. Cl.
*F16C 33/66* (2006.01)
*F16C 33/76* (2006.01)

(52) U.S. Cl. ............... 384/462; 384/472; 384/504; 384/477; 384/484

(58) Field of Classification Search ........... 384/462, 384/465, 472, 473, 490, 504, 512, 477, 484; 475/160, 331; 74/606 R, 607
See application file for complete search history.

(56) References Cited

U.S. PATENT DOCUMENTS

| | | | |
|---|---|---|---|
| 2,135,477 | A | 4/1935 | Griswold |
| 2,839,343 | A | 6/1958 | Bensch |
| 4,948,271 | A | 8/1990 | Nunotani et al. |
| 2002/0186910 | A1 | 12/2002 | Maret |
| 2005/0031240 | A1 | 2/2005 | Dodoro et al. |
| 2005/0220383 | A1* | 10/2005 | Yokota et al. .............. 384/523 |
| 2005/0232524 | A1 | 10/2005 | Fukuda et al. |

FOREIGN PATENT DOCUMENTS

| | | |
|---|---|---|
| DE | 103 08 702 A1 | 9/2004 |
| DE | 10 2004 020 851 A1 | 11/2005 |
| EP | 1 134 442 A3 | 1/2001 |
| EP | 1 105 662 A1 | 6/2001 |

(Continued)

OTHER PUBLICATIONS

European Search Report dated May 6, 2008.

(Continued)

*Primary Examiner*—Thomas R Hannon
(74) *Attorney, Agent, or Firm*—McGinn IP Law Group, PLLC (57) ABSTRACT

In a bearing device, a double row rolling bearing for supporting a pinion gear-side portion of a pinion shaft on a case (annular wall) is formed by a tandem-type double row angular contact ball bearing. A first row of balls having a larger pitch circle diameter are disposed between inner and outer rings of the double row angular contact ball bearing at a region near to the pinion gear, and a second row of balls having a smaller pitch circle diameter are disposed between the inner and outer rings at a region remote from the pinion gear. A bearing internal space is divided into a first bearing internal space containing the first ball row and open toward the pinion gear and a second bearing internal space containing the second ball row and sealed by partition walls formed respectively by bearing seals, lubricating grease being sealed in the second bearing internal space.

6 Claims, 8 Drawing Sheets

FOREIGN PATENT DOCUMENTS

| | | |
|---|---|---|
| EP | 1 134 442 A2 | 9/2001 |
| EP | 1 361 373 A1 | 11/2003 |
| EP | 1 443 228 A1 | 8/2004 |
| EP | 1 574 729 A1 | 9/2005 |
| EP | 1 693 581 A1 | 8/2006 |
| JP | 62-278370 | 12/1987 |
| JP | 5-66327 | 9/1993 |
| JP | 9-105450 | 4/1997 |
| JP | 10-220468 | 8/1998 |
| JP | 2003-166627 | 6/2003 |
| JP | 2003-172348 | 6/2003 |
| JP | 2003-294032 | 10/2003 |
| JP | 2004-162629 | 6/2004 |
| JP | 2004-169889 | 6/2004 |
| JP | 2004-190728 | 7/2004 |
| JP | 2004-211861 | 7/2004 |
| JP | 2005-308177 | 11/2005 |
| JP | 2006-009930 | 1/2006 |

OTHER PUBLICATIONS

European Search Report dated Aug. 27, 2007.
English translation of Japanese Office Action dated Mar. 16, 2010.

* cited by examiner

ROLLING BEARING DEVICE FOR SUPPORTING PINION SHAFT

BACKGROUND OF THE INVENTION

1. Field of the Invention

This invention relates to a rolling bearing device for supporting a pinion shaft (hereinafter referred to as "bearing device") for rotatably supporting two portions (that is, a pinion gear-side portion and a counter-pinion-gear-side portion) of a pinion shaft (incorporated in an automotive differential apparatus, a transfer apparatus for a four-wheel drive vehicle or the like) by rolling bearings.

2. Related Art

In an automotive differential apparatus and a transfer apparatus for a four-wheel drive vehicle, it has heretofore been proposed to use a bearing device, in which tapered roller bearings (serving as rolling bearings) are provided respectively at a pinion gear-side portion (one axial end portion) of a pinion shaft and a counter-pinion-gear-side portion (the other axial end portion) of the pinion shaft, and the pinion shaft is rotatably supported on an inner periphery surface of a case by the two tapered roller bearings (see JP-A-9-105450 Publication and JP-A-10-220468 Publication).

In the above bearing device, a radial load and a thrust load simultaneously act on the pinion gear-side tapered roller bearing, and since the proportion of the thrust load is high, this tapered roller bearing has a large contact angle. Therefore, a large frictional resistance acts on this tapered roller bearing, so that a rotational torque is large.

Under the circumstances, there has been proposed a bearing device in which instead of a tapered roller bearing, a double row rolling bearing is used as a pinion gear-side rolling bearing, and this double row rolling bearing includes two axially-arranged rows of rolling elements having different pitch circle diameters (JP-A-2004-190728 Publication).

Figure 7:
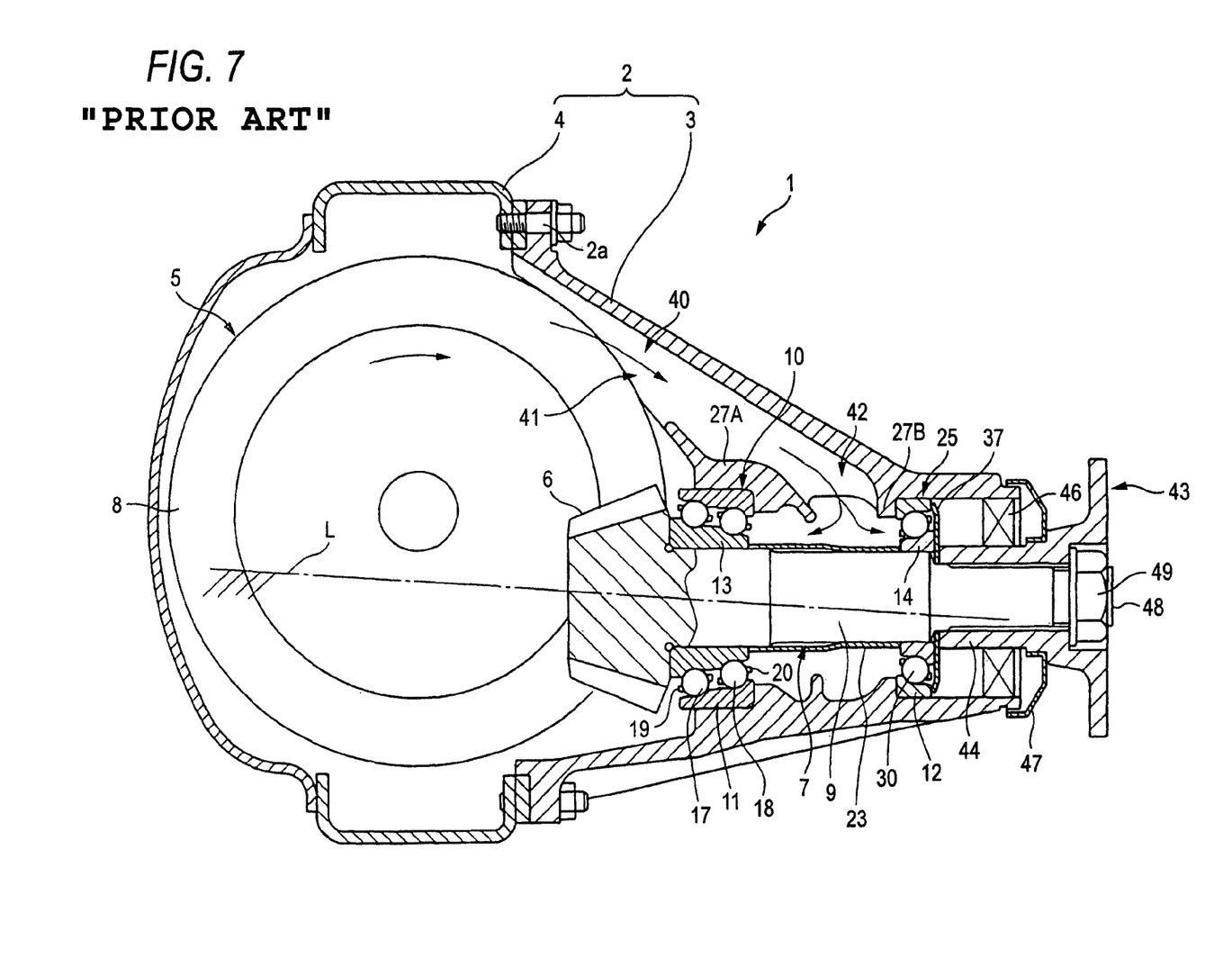
FIG. 7 a cross-sectional view of a differential apparatus incorporating a conventional bearing device.

A differential apparatus, in which a pinion gear-side portion of a pinion shaft is supported on an inner peripheral surface of a case by this double row rolling bearing, will be described with reference to FIG. 7.

The differential apparatus 1 includes the case 2. The case 2 comprises a front case 3 and a rear case 4, and the two cases 3 and 4 are joined together by bolt/nut arrangements 2a.

Bearing-mounting annular walls 27A and 27B are formed within the front case 3. The case 2 contains a differential mechanism 5 connecting right and left wheels together in a differential manner, and a pinion shaft 7 having a pinion gear 6.

The pinion gear 6 is in mesh with a ring gear 8 of the differential mechanism 5.

A shaft portion 9 of the pinion shaft 7 is stepped to increase in diameter toward the pinion gear 6. A pinion gear-side portion of the shaft portion 9 of the pinion shaft 7 is rotatably supported on the annular wall 27A of the front case 3 via a double row rolling bearing 10.

A counter-pinion-gear-side portion (that is, a portion remote from the pinion gear) of the shaft portion 9 of the pinion shaft 7 is rotatably supported on the annular wall 27B of the front case 3 via a rolling bearing 25.

The front case 3 has an oil circulating passageway 40 formed between its outer wall and the annular wall 27A, and an oil inlet 41 of the oil circulating passageway 40 is open toward the ring gear 8, and an oil outlet 42 of the oil circulating passageway 40 is open to a region between the annular walls 27A and 27B.

A closure plate 37 is inserted into the front case 3 through a smaller-diameter opening thereof, and is fitted on the shaft portion 9 of the pinion shaft 7.

A barrel portion 44 of a companion flange 43 is spline-fitted on the shaft portion 9, and an end surface of this barrel portion 44 is held against the closure plate 37. An oil seal 46 is mounted on the barrel portion 44 of the companion flange 43.

A seal protection cup 47 is attached to the smaller-diameter opening portion of the front case 3.

A nut 49 is threaded on a threaded portion 48 of the shaft portion 9, thereby imparting a predetermined preload to rows 17 and 18 of rolling elements of the double row rolling bearing 10 and a row 30 of rolling elements of the rolling bearing 25.

In the above construction, the nut 49 is threaded on the threaded portion 48, so that an inner ring 13 of the double row rolling bearing 10 and an inner ring 14 of the rolling bearing 25 are clamped in the axial direction to be held between the end surface of the pinion gear 6 and the end surface of the companion flange 43, thereby imparting the predetermined preload to the rows 17 and 18 of rolling elements of the double row rolling bearing 10 and the row 30 of rolling elements of the rolling bearing 25 through the closure plate 37 and a plasticity spacer 23.

Figure 8:
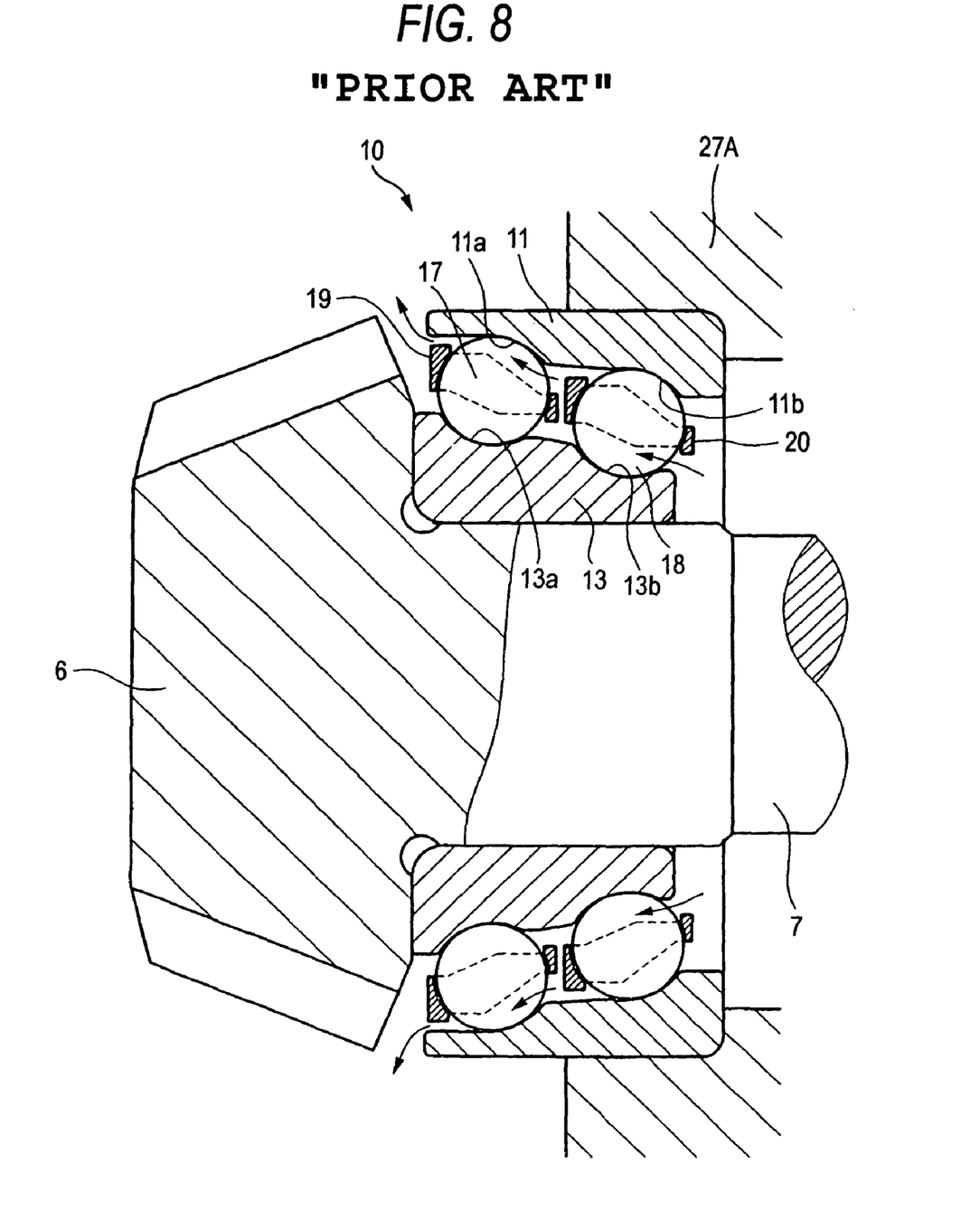
FIG. 8 is a cross-sectional view showing an important portion of FIG. 7 on an enlarged scale.

The conventional double row rolling bearing 10 will be described with reference to FIG. 8. This double row rolling bearing 10 is a double row angular contact ball bearing. This double row angular contact ball bearing includes the two axially-arranged rows of rolling elements (having different pitch circle diameters) disposed between the inner and outer rings, contact angles of the two rows of rolling elements being set in the same direction. The double row rolling bearing 10 comprises the double-raceway outer ring 11 having a larger-diameter raceway 11a and a smaller-diameter raceway 11b which are arranged axially, the double-raceway inner ring 13 having a larger-diameter raceway 13a and a smaller-diameter raceway 13b which are arranged axially, and are opposed respectively to the larger-diameter raceway 11a and the smaller-diameter raceway 11b in the radial direction, the larger-diameter row 17 of balls disposed between the larger-diameter raceways 11a and 13a, the smaller-diameter row 18 of balls disposed between the smaller-diameter raceways 11b and 13b, a larger-diameter-side cage 19 holding the larger-diameter row 17 of balls, and a smaller-diameter-side cage 20 holding the smaller-diameter row 18 of balls.

In this double row rolling bearing 10, the inclinations of the contact angles of the larger-diameter and smaller-diameter rows 17 and 18 of balls to the corresponding raceways 11a and 13a; 11b and 13b are in the same direction.

The reason why the double row rolling bearing 10 is used as the pinion gear-side bearing while the rolling bearing 25 is used as the counter-pinion-gear-side bearing is that capacities of loads (i.e., an axial load and a radial load) are larger at the pinion gear-side than at the counter-pinion-gear-side.

A problem with the double row rolling bearing 10 of the above construction will be described below.

The double row rolling bearing 10 is in the form of a double row angular contact ball bearing, and the diameters of the pitch circles of the two ball rows 17 and 18 are different from each other.

When the pinion shaft rotates about its axis, a pumping action is produced by the rotation of the inner ring 13 and the rolling motion of balls forming the ball rows 17 and 18, and oil from the oil outlet 42 of the oil circulating passageway 40 is drawn through an opening between the annular walls 27A and 27B into the interior of the double row rolling bearing 10 from the right end side (in the drawings) of this bearing, and the thus drawn oil passes through the interior of the bearing as indicated by arrows (in the drawings).

By this pumping action, an excessive amount of oil larger than the required amount for lubrication purposes passes through the bearing in the directions of the arrows, and because of this excess passing oil, an oil agitation loss in the interior of the double row rolling bearing 10 increases, and this causes a torque loss.

SUMMARY OF THE INVENTION

It is therefore an object of this invention to provide a bearing device in which passing oil in the interior of a bearing is eliminated, thereby reducing a torque loss due to the agitating of such passing oil, and besides in order that insufficient lubrication will not occur in the interior of the bearing as a result of eliminating the passing oil in the interior of the bearing, the bearing is suitably lubricated so as to enhance the rotating performance of the bearing.

According to a first aspect of the present invention, there is provided a rolling bearing device adapted for supporting a pinion shaft provided with a pinion gear at one end thereof, including:

a case storing oil therein in which the pinion gear is housed; and a double row angular contact ball bearing attached on the case and provided with at least two rows of balls between inner and outer rings for supporting a part of the pinion shaft, a first row of balls having a larger pitch circle diameter at a region near to the pinion gear, and a second row of balls having a smaller pitch circle diameter at a region remote from the pinion gear;

wherein a bearing internal space is divided into a first bearing internal space containing the first row of balls and open toward the pinion gear and a second bearing internal space containing the second row of balls and sealed by a partition wall formed by a bearing seal so that lubricating grease is sealed in the second bearing internal space.

In the first aspect of the invention, the second bearing internal space is sealed, and therefore even when the pinion shaft rotates about its axis, a pumping action will not be produced by the relative rotation of the inner and outer rings, the rolling motion of the ball row, etc., and oil will not flow into the first and second bearing internal spaces, and an oil agitation loss imposed on the first and second ball rows is reduced to a minimum, so that a torque loss can be positively reduced.

In this case, the first bearing internal space containing the first ball row is open to the interior of the case, and therefore when oil within the case is agitated, the bearing parts (including raceways of the inner and outer rings and the first ball row) within the first bearing internal space are lubricated by this oil. And besides, the grease is sealed in the second bearing internal space, and therefore the bearing parts (including raceways of the inner and outer rings and the second ball row) within the second bearing internal space are lubricated by this grease.

In this case, the grease within the second bearing internal space rotates together with the bearing parts within the second bearing internal space in synchronism with these bearing parts, and therefore the grease is not substantially agitated, and a torque loss due to the agitating of the grease is small, and is at a negligible level.

In the first aspect of the invention, preferably, a part of the first row of balls is exposed outwardly of an end surface of the outer ring on a side of the pinion gear so that oil spattered by rotating the pinion gear deposits on the first row of balls.

In this case, preferably, an almost half area or more on the outer ring side hemisphere surface of each ball in the first ball row is exposed on the side of the pinion gear. Namely, each ball of the first ball row is preferably exposed such that a median plane of the ball perpendicular to the axis of the bearing (that is, perpendicular to the axis of the pinion shaft) is located at the end surface of the outer ring on the side of the pinion gear or near to the pinion gear in the axial direction. With this exposure arrangement, oil spattered by the rotating pinion gear can effectively deposit on the first row of balls.

According to a second aspect of the invention, there is provided a rolling bearing device adapted for supporting a pinion shaft provided with a pinion gear at one end thereof, including:

a case storing oil therein in which the pinion gear is housed; and a double row rolling bearing attached on the case for supporting a part of the pinion shaft;

wherein an inner ring of the double row rolling bearing is divided into a first inner ring portion near to the pinion gear and a second inner ring portion remote from the pinion gear, and an outer ring of the double row rolling bearing is divided into a first outer ring portion near to the pinion gear and a second outer ring portion remote from the pinion gear, a row of balls having a contact angle relative to the first inner and outer ring portions are provided between the first inner and outer ring portions to form a single row angular contact ball bearing, and a row of cylindrical rollers are provided between the second inner and outer ring portions to form a cylindrical roller bearing.

In the second aspect of the invention, apart of the double row rolling bearing (i.e. pinion gear-side portion) is formed into the single angular contact ball bearing construction, and with this construction the single angular contact ball bearing can bear a radial load and an axial load acting in one direction. Also, the cylindrical roller bearing can bear a radial load, and also can provide radial rigidity. And besides, the cylindrical roller bearing does not produce an oil pumping action, and therefore the flowing of the oil into and out of a bearing internal space is eliminated, thus eliminating an oil agitation loss as encountered in the conventional construction, so that a torque loss can be positively reduced.

In the bearing devices of the present invention, the oil pumping action in the interior of the bearing is eliminated, and therefore even when the pinion shaft rotates about its axis, oil will not flow into the interior of the bearing, and the oil agitation loss in the interior of the bearing can be reduced to a minimum, thereby positively and sufficiently reducing a torque loss.

In the invention, a torque loss can be positively and sufficiently reduced by eliminating the introduction of passing oil into the interior of the bearing, and besides in order that lubrication in the interior of the bearing will not become insufficient because of this construction, the interior of the bearing can be lubricated so as to enhance the rotating performance of the bearing device.

DETAILED DESCRIPTION OF THE PREFERRED EMBODIMENTS

Preferred embodiments of bearing devices of the present invention (hereinafter referred to as "bearing device") will be described with reference to the accompanying drawings. The overall construction of the bearing device is generally similar to that of FIG. 7, and therefore the showing of the whole of the bearing device and detailed description of the similar construction will be omitted to avoid a repeated explanation.

First Embodiment

Figure 1:
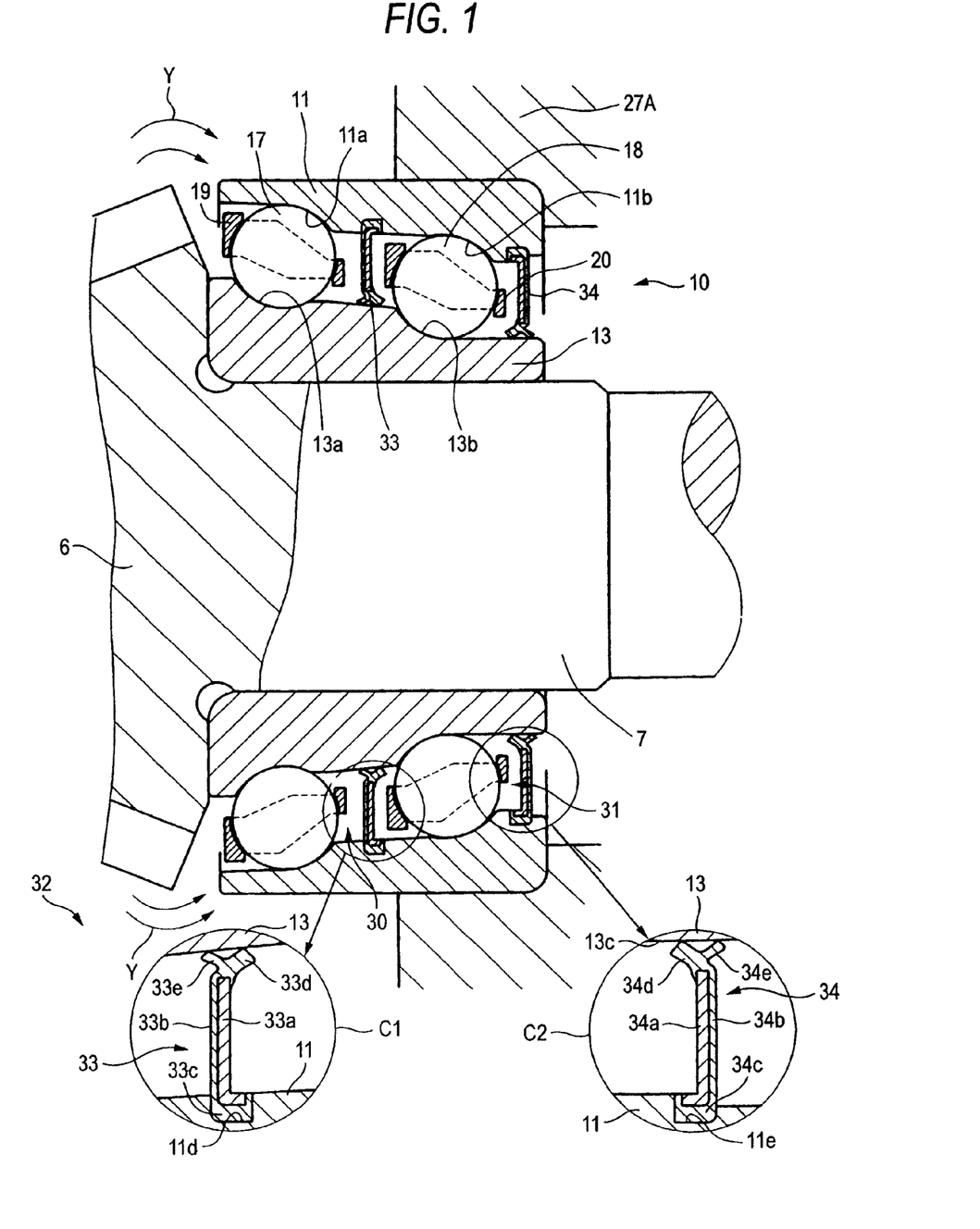
FIG. 1 is a cross-sectional view showing an important portion of a first embodiment of a bearing device of the present invention.

A first embodiment of a bearing device of the invention will now be described with reference to FIG. 1. FIG. 1 shows only an important portion of this bearing device, and those portions thereof similar to corresponding portions of the conventional example will be designated by identical reference numerals, respectively.

In the first embodiment, a pinion gear-side double row rolling bearing 10 is in the form of a double row angular contact ball bearing.

Referring again to this construction, an outer ring 11 has two axially-arranged raceways, that is, a larger-diameter raceway 11a and a smaller-diameter raceway 11b. An inner ring 13 has two axially-arranged raceways, that is, a larger-diameter raceway 13a and a smaller-diameter raceway 13b. A first row 17 of balls are disposed between the raceways 11a and 13a, and a second row 18 of balls are disposed between the raceways 11b and 13b. The ball rows 17 and 18 are held by cages 19 and 20, respectively.

In the double row rolling bearing 10 of the above construction, the first ball row 17 is disposed between the inner and outer rings 13 and 11 at a region near to a pinion gear 6 such that this first ball row 17 has a larger pitch circle diameter. The second ball row 18 is disposed between the inner and outer rings 13 and 11 at a region remote from the pinion gear 6 such that this second ball row 18 has a smaller pitch circle diameter.

A bearing internal space formed between the opposed inner and outer rings 13 and 11 is divided into a first bearing internal space 30 containing the first ball row 17 and a second bearing internal space 31 containing the second ball row 18.

The first bearing internal space 30 is open to the interior 32 of a case.

The second bearing internal space 31 is sealed by partition walls formed respectively by bearing seals 33 and 34 provided respectively at axially-opposite side portions of this second bearing internal space 31. Lubricating grease (not shown) is sealed in the second bearing internal space 31.

The amount and kind of the sealed grease are not limited.

In the above construction, the inner ring 13 of the double row rolling bearing 10 rotates together with a pinion shaft 7, so that the inner and outer rings 13 and 11 rotate relative to each other, and also the first and second ball rows 17 and 18 rotate.

The bearing seals 33 and 34 are shown on an enlarged scale at portions C1 and C2 in the drawings. In this embodiment, these bearing seals 33 and 34 are contact seals.

Each bearing seal 33, 34 comprises a reinforcing metal ring 33a, 34a of an annular shape, and an annular elastic member 33b, 34b made of an elastic material (such as rubber, a synthetic resin or the like) and connected to the metal ring 33a, 34a to cover part of a surface thereof.

An outer peripheral edge portion (seal head portion) 33c, 34c of the elastic members 33b, 34b of the bearing seal 33, 34 is elastically deformed, and is retainingly engaged in a seal mounting groove 11d, 11e formed in an inner peripheral surface of the outer ring 11 over an entire periphery thereof, the two grooves 11d and 11e being formed respectively on the inner peripheral surface of the outer ring 11. A main lip portion 33d, 34d and an auxiliary lip portion 33e, 34e are formed at an inner peripheral edge of the elastic member 33b, 34b, each of the main lip portion and the auxiliary lip portion having a radially inwardly-extending arm-shaped cross-section.

The main lip portion 33d, 34d can slide over an outer peripheral surface 13c of the inner ring 13. Preferably, the main lip portion 33d, 34d slides in slightly-contacted relation to the outer peripheral surface of the inner ring 13 in order to reduce a torque. The bearing seal 33, 34 may be in the form of a non-contact seal so that the torque can be more effectively reduced.

In this case, the second bearing internal space 31 is sealed by the bearing seals 33 and 34, and therefore a pumping action which would otherwise be produced by the relative rotation of the inner and outer rings 13 and 11, the rolling motion of the second ball row 18, etc., will not act on this second bearing internal space 31, and therefore oil will not flow into the first and second bearing internal spaces 30 and 31 from the smaller-diameter-side of the bearing.

Therefore, any oil does not exist within the second bearing internal space 31, and only the grease exists within this space 31, and therefore an oil agitation loss does not develop at all within the space 31. And besides, the grease rotates together with the bearing constituent elements (the smaller-diameter raceways 13b and 11b of the inner and outer rings 13 and 11 and the second ball row 18) within the second bearing internal space 31 generally in synchronism with these bearing constituent elements, and therefore the grease is not agitated by the bearing constituent elements within the second bearing internal space 31, or is agitated only slightly even if so. As a result, a agitation loss within the second bearing internal space 31 is substantially at a negligible level.

On the other hand, with respect to the first bearing internal space 30, oil will not flow into this space 30 from the second bearing internal space 31. However, the first bearing internal space 30 is open to the interior 32 of the case, and also is disposed near to the pinion gear 6, and therefore oil spattered by the pinion gear 6 can deposit on the bearing constituent elements (the larger-diameter raceways 11a and 13a of the inner and outer rings 13 and 11 and the first ball row 17)

within the first bearing internal space 30 as indicated by arrows Y. As a result, the bearing constituent elements within the first bearing internal space 30 can be lubricated.

As described above, in this first embodiment, the oil agitation loss can be kept to a minimum, so that the torque loss can be positively and sufficiently reduced.

Second Embodiment

A second embodiment of a bearing device of the invention will be described with reference to FIG. 2.

In this second embodiment, that side of a first ball row 17 facing a pinion gear 6 is exposed outwardly of a pinion gear-side end surface 11c of an outer ring 11 so that oil spattered by the rotating pinion gear 6 can deposit on the first ball row 17. The other construction is similar to that of the first embodiment.

In the second embodiment, a second bearing internal space 31 is sealed by bearing seals 33 and 34, and therefore oil will not be supplied to the first ball row 17 from a smaller-diameter side of a double row rolling bearing 10.

In this case, as described above for the first embodiment, a first bearing internal space 30 is open to the interior 32 of a case, and also is disposed near to the pinion gear 6, and therefore oil spattered by the pinion gear 6 can deposit on bearing constituent elements (larger-diameter raceways 11a and 13a of inner and outer rings 13 and 11 and the first ball row 17) within the first bearing internal space 30 as indicated by arrows Y.

However, in the first embodiment, the oil spattered as indicated by arrows Y does not, in some cases, deposit on the first ball row 17 partly because an oil agitating force by the pinion gear 6 in the interior 32 of the case is small. In the second embodiment, the first ball row 17 is exposed outwardly of the pinion gear-side end surface 11c of the outer ring 11 so that the oil spattered by the pinion gear 6 can positively deposit on the bearing constituent elements within the first bearing internal space 30 as indicated by arrows Y.

Figure 2:
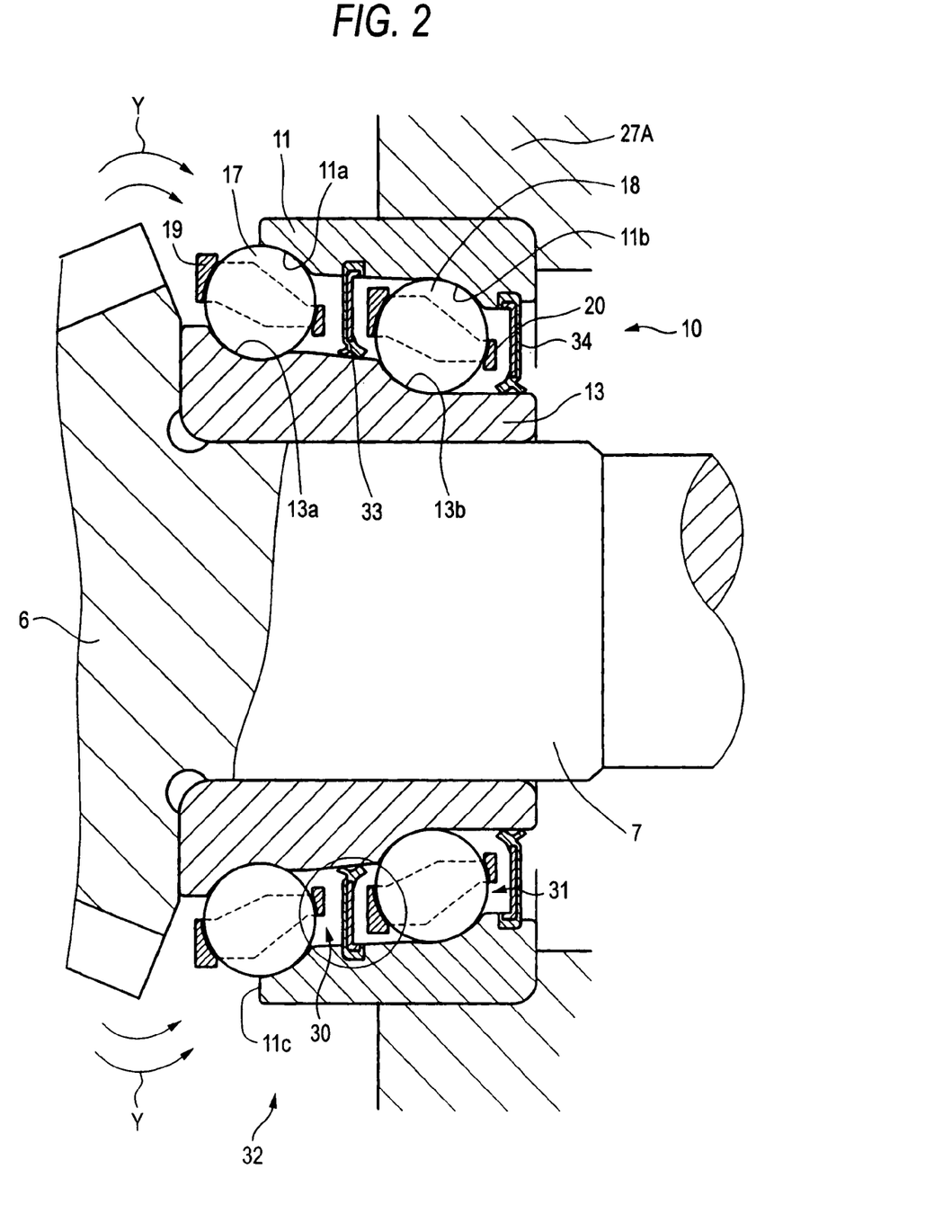
FIG. 2 is a cross-sectional view showing an important portion of a second embodiment of a bearing device of the invention.

Particularly in the case where one end portion of the outer ring 11 disposed at the first ball row 17 is shortened, so that the first ball row 17 is exposed radially outwardly as shown in FIG. 2, this arrangement is effective.

Third Embodiment

Figure 3:
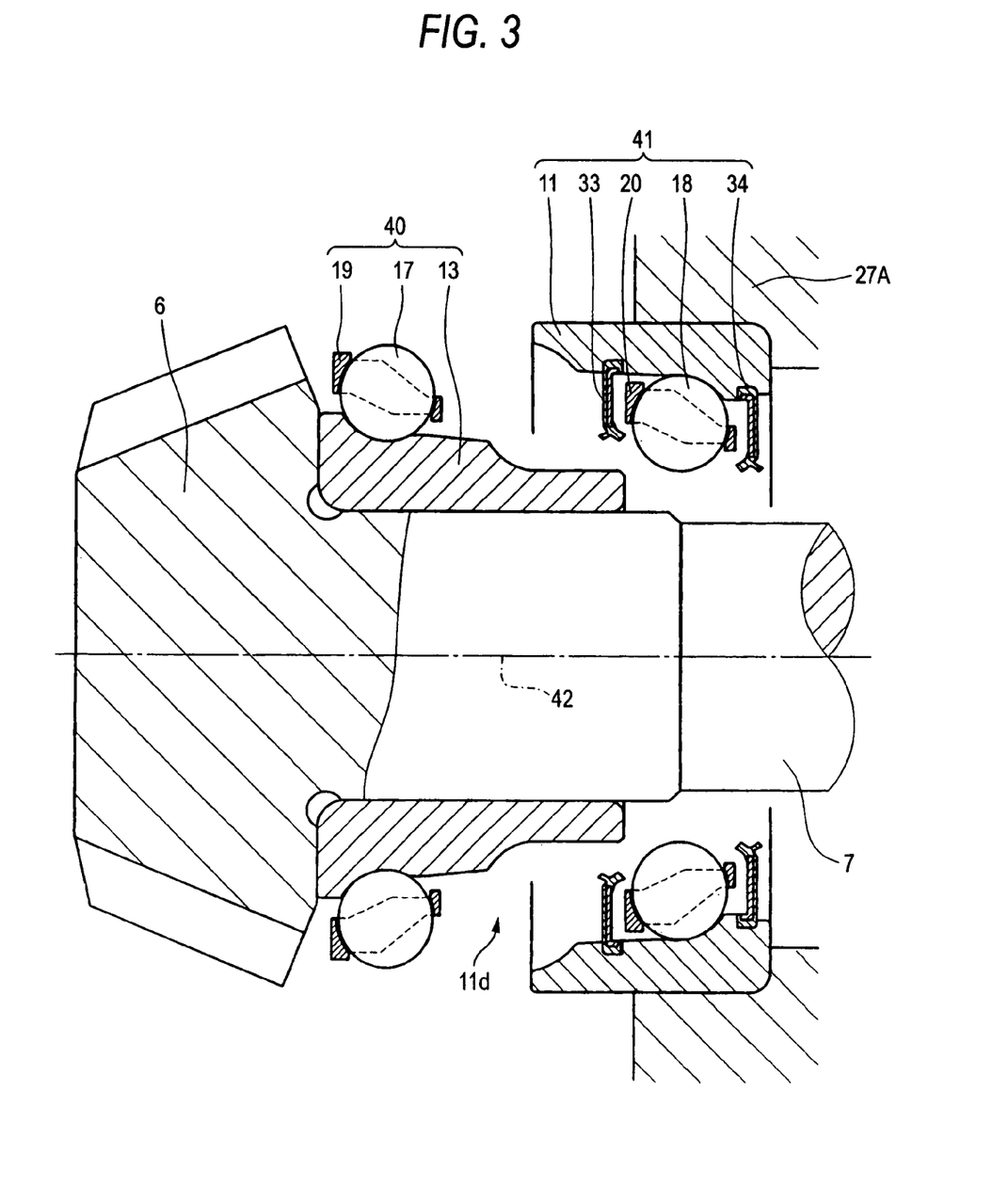
FIG. 3 is related to a third embodiment of the invention, and is a cross-sectional view showing a condition before an inner ring assembly is mounted on an outer ring assembly in the bearing device of the second embodiment.

A method of assembling the bearing device of the second embodiment will be described with reference to FIGS. 3 to 5. FIG. 3 is a cross-sectional view showing a condition before an inner ring assembly is mounted on the outer ring, FIG. 4 is a cross-sectional view showing the process of mounting the inner ring assembly on the outer ring, and FIG. 5 is a cross-sectional view showing a condition after the inner ring assembly is mounted on the outer ring.

In this third embodiment, the inner ring 13, the first ball row 17 and a first cage 19 jointly form the inner ring assembly 40. Also, the outer ring 11, a second ball row 18, a second cage 20 and first and second bearing seals 33 and 34 jointly form an outer ring assembly 41.

This double row rolling bearing 10 is the double row rolling bearing of the second embodiment. As shown in FIG. 3, the outer ring assembly 41 is fixed to an inner peripheral surface of an annular wall 27A, and the inner ring assembly 40 is fitted on a pinion shaft 7. Axes of the outer ring assembly 41, the pinion shaft 6 and the inner ring assembly 40 coincide with a common axis 42.

Figure 4:
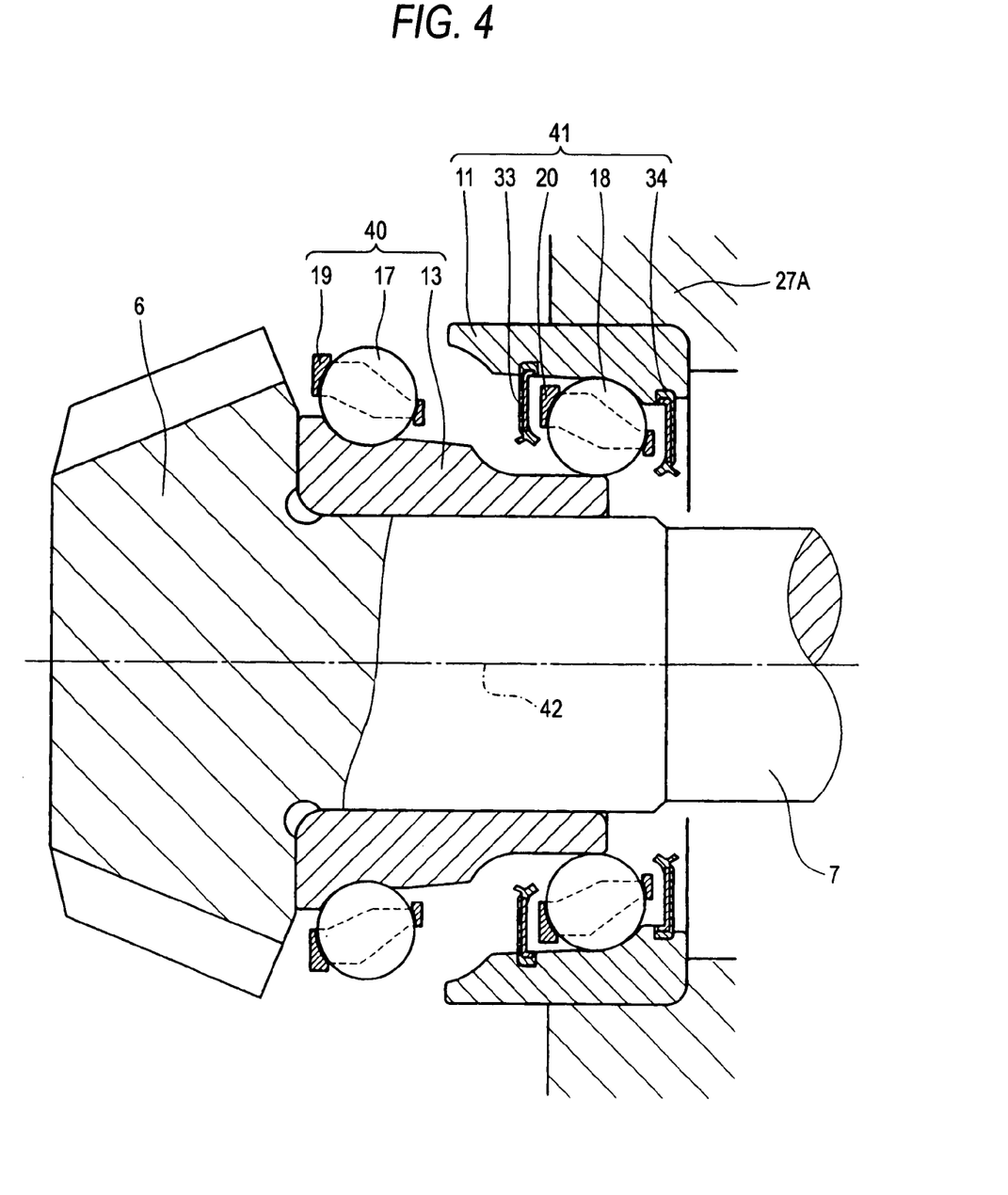
FIG. 4 is a cross-sectional view showing the process of mounting the inner ring assembly of FIG. 3 on the outer ring assembly.
Figure 5:
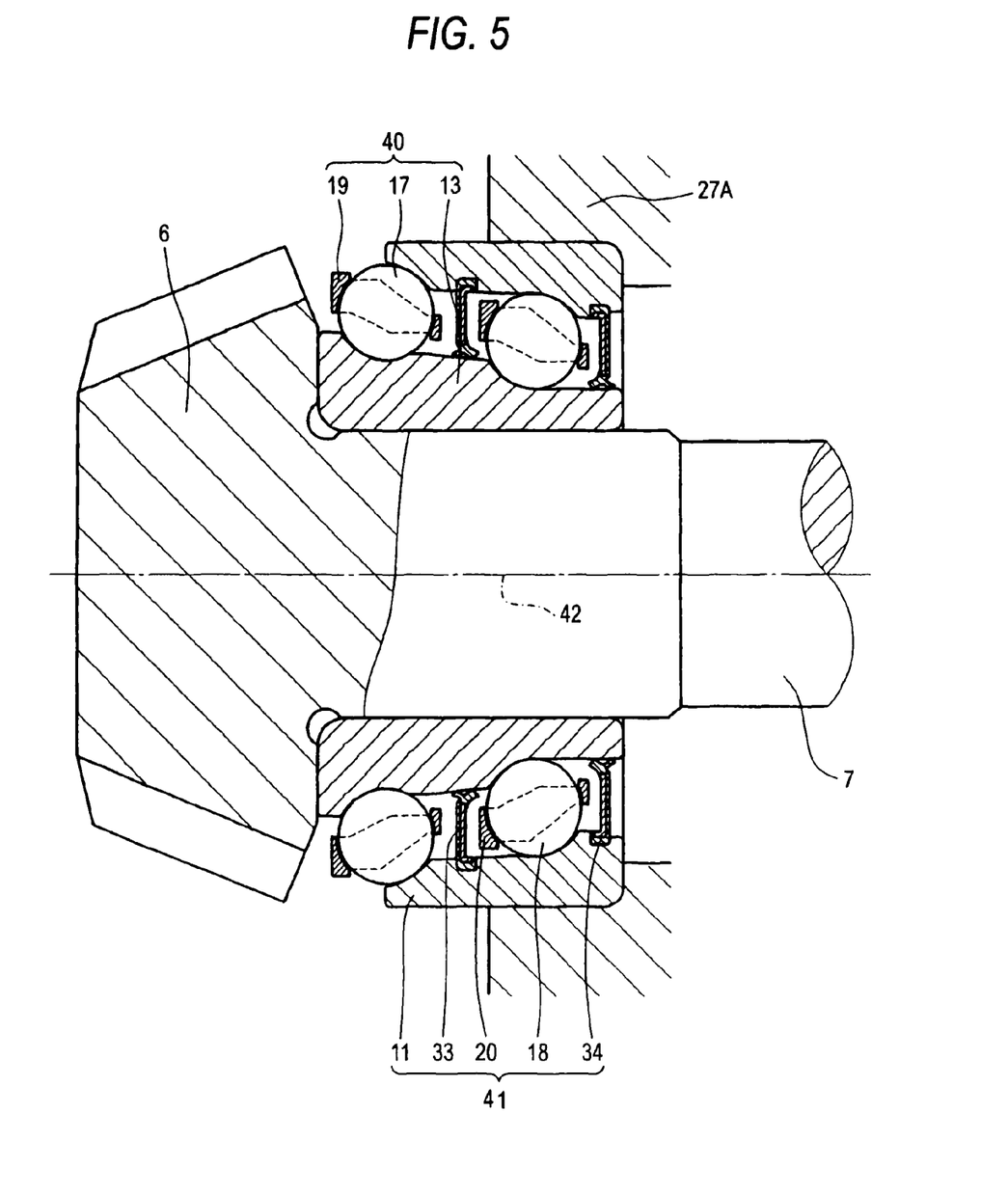
FIG. 5 is a cross-sectional view showing a condition after the inner ring assembly of FIG. 4 is mounted on the outer ring assembly.

In the condition of FIG. 3 in which the inner ring assembly 40 is fitted on the pinion shaft 7, the pinion shaft 7 is inserted into a larger-diameter-side opening 11d of the outer ring 11, with its axis coinciding with the common axis 42 as shown in FIG. 4.

In this inserting operation, lip portions 33d and 33e of the bearing seal 33 and lip portions 34d and 34e of the bearing seal 34 are smoothly mounted on the inner ring 13 of the inner ring assembly 40, since seal head portions 33c and 34c of the bearing seals 33 and 34 are fixed to the outer ring 11. When the pinion shaft 7 is further inserted into the larger-diameter-side opening 11d of the outer ring 11, the assembling of the double row rolling bearing 10 is completed as shown in FIG. 5.

Fourth Embodiment

Figure 6:
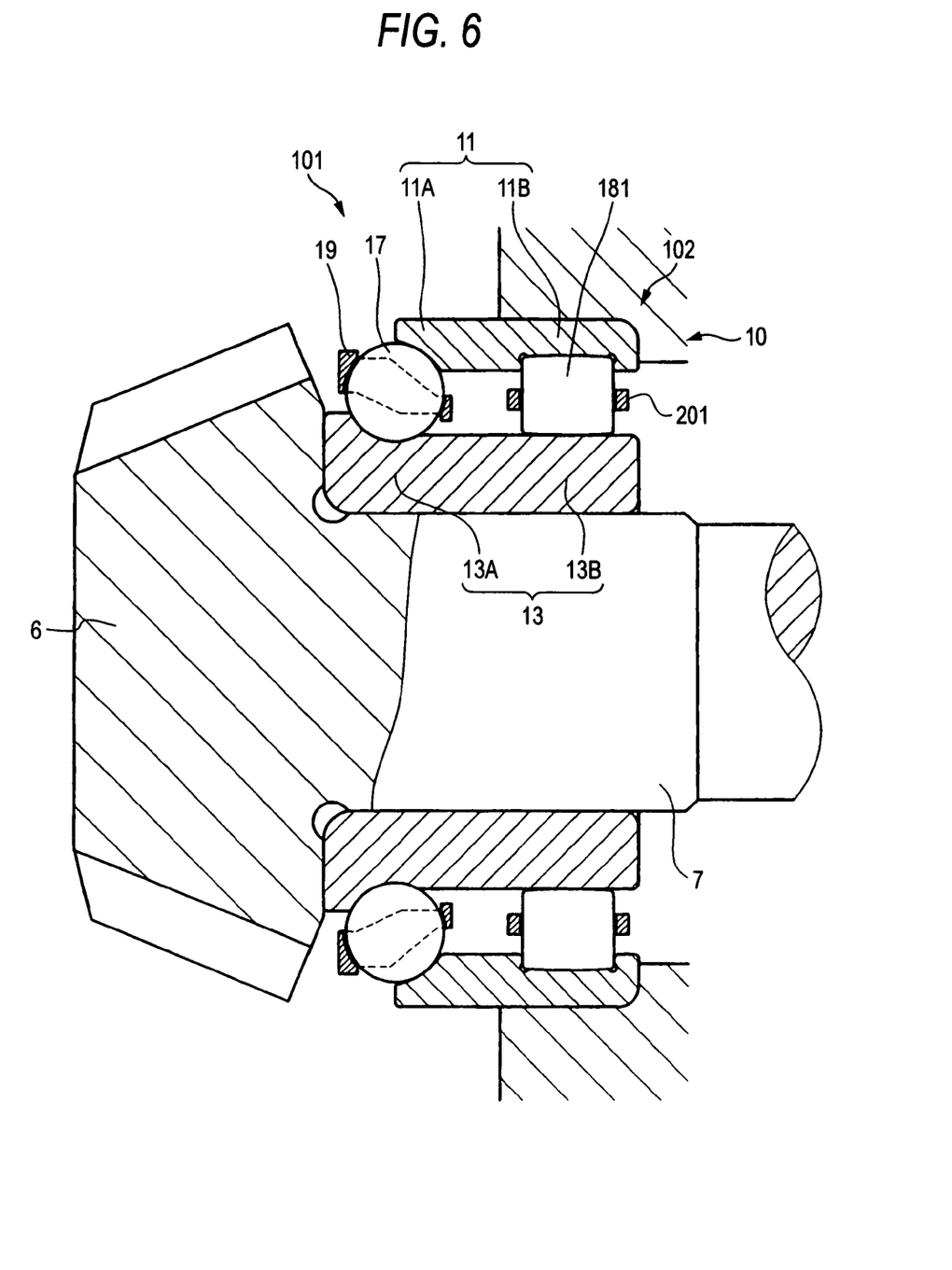
FIG. 6 is a cross-sectional view showing an important portion of a fourth embodiment of a bearing device of the invention.

A fourth embodiment of a bearing device of the invention will be described with reference to FIG. 6. In the bearing device of the fourth embodiment, a double row rolling bearing 10 is of such a double row rolling bearing construction that a first row of rolling elements disposed near to a pinion gear 6 are formed by a row 17 of balls, while a second row of rolling elements remote from the pinion gear 6 are formed by a row 181 of cylindrical rollers.

The ball row 17 which forms the first row of rolling elements and comprises the plurality of balls forms, together with first inner and outer ring portions 13A and 11A (which have raceways for the ball row 17), a single angular contact ball bearing 101.

The cylindrical roller row 181 which forms the second row of rolling elements and comprises the plurality of cylindrical rollers forms, together with second inner and outer ring portions 13B and 11B (which have raceways for the cylindrical roller row 181), a cylindrical roller bearing 102. Full crowning or partial crowning is applied to an outer peripheral surface of the cylindrical roller in order to reduce a torque.

In the fourth embodiment, the inner and outer ring portions 13A and 11A near to the pinion gear 6 are formed into the single angular contact ball bearing construction, and with this construction the single angular contact ball bearing 101 can bear a radial load and an axial load acting in one direction. Also, the inner and outer ring portions 13B and 11B remote from the pinion gear 6 are formed into the cylindrical roller bearing construction, and with this construction the cylindrical roller bearing 102 can bear a radial load, and also can provide radial rigidity.

Furthermore, the inner and outer ring portions 13B and 11B remote from the pinion gear 6 are formed into the cylindrical roller bearing (102) construction, and the ball row (first row) 17 of the single angular contact ball bearing 101 and the roller row 181 of the cylindrical roller bearing 102 have substantially the same pitch circle diameter. With this construction, an oil pumping action is eliminated, thereby eliminating the flowing of oil into and out of an internal space of the double row rolling bearing 10, so that a torque loss due to a resistance produced by the agitating of oil passing through the interior of the double row rolling bearing can be positively reduced.

What is claimed is:

1. A rolling bearing device adapted for supporting a pinion shaft provided with a pinion gear at one end thereof, comprising:
 a case storing oil therein in which the pinion gear is housed; and
 a double row angular contact ball bearing attached on the case and provided with at least two rows of balls between inner and outer rings for supporting a part of the pinion shaft, a first row of balls disposed at a region near to the pinion gear, and a second row of balls disposed at a region remote from the pinion gear, the first row of balls comprising a pitch circle diameter greater than a pitch circle diameter of the second row of balls, and the first row of balls comprising contact angles which are in a same direction as contact angles of the second row of balls;

wherein a bearing internal space is divided into a first bearing internal space containing the first row of balls and open toward the pinion gear and a second bearing internal space containing the second row of balls, the second bearing internal space being sealed by a partition wall of a plurality of partition walls, formed by a bearing seal and disposed on one side of the second row of balls between the first row of balls and the second row of balls, and an other partition wall of the plurality of partition walls, formed by an other bearing seal and on an other side of the second row of balls, such that lubricating grease is sealed in the second bearing internal space.

2. A rolling bearing device for supporting a pinion shaft according to claim 1, wherein a part of the first row of balls is exposed outwardly of an end surface of the outer ring on a side of the pinion gear such that oil spattered by rotating the pinion gear deposits on the first row of balls.

3. A rolling bearing device for supporting a pinion shaft according to claim 1, wherein at least one of the partition wall and the other partition wall further comprises:
   a reinforcing metal ring; and
   an annular elastic member connected to the metal ring, the annular elastic member including:
      an outer peripheral edge portion engaged in a seal mounting groove of the outer ring;
      a main lip portion formed at an inner peripheral edge of the annular elastic member; and
      an auxiliary lip portion formed at the inner peripheral edge of the annular elastic member.

4. A rolling bearing device for supporting a pinion shaft according to claim 1, wherein the partition wall and the other partition wall comprise contact seals.

5. A rolling bearing device for supporting a pinion shaft according to claim 1, wherein substantially one-half of an area of an outer ring side hemisphere surface of balls of the first row of balls is exposed on a pinion gear side of the rolling bearing device.

6. A rolling bearing device for supporting a pinion shaft according to claim 1, wherein the partition wall and the other partition wall are disposed so as to prevent oil flow into the second bearing internal space.

* * * * *